United States Patent
Tian

(10) Patent No.: US 10,322,814 B1
(45) Date of Patent: Jun. 18, 2019

(54) AIRCRAFT VERTICAL STABILIZER HAVING A LIFT PROPELLER AND THE METHOD OF USING THE SAME

(71) Applicant: AutoflightX International Limited, Causeway Bay (HK)

(72) Inventor: Yu Tian, Hong Kong (HK)

(73) Assignee: AutoflightX International Limited, Causeway Bay (HK)

( * ) Notice: Subject to any disclaimer, the term of this patent is extended or adjusted under 35 U.S.C. 154(b) by 0 days.

(21) Appl. No.: 16/120,259

(22) Filed: Sep. 1, 2018

(51) Int. Cl.
  *B64D 31/00* (2006.01)
  *B64C 39/12* (2006.01)
  *B64C 39/02* (2006.01)

(52) U.S. Cl.
  CPC ............ *B64D 31/00* (2013.01); *B64C 39/024* (2013.01); *B64C 39/12* (2013.01); *B64C 2201/104* (2013.01); *B64C 2201/165* (2013.01)

(58) Field of Classification Search
  CPC ......... B64C 27/26; B64C 29/00; B64C 39/04; B64C 39/08; B64C 39/12; B64C 11/12; B64C 39/024; B64C 2201/021; B64C 2201/104; B64C 2201/165; B64D 31/00
  See application file for complete search history.

(56) References Cited

U.S. PATENT DOCUMENTS

| | | | |
|---|---|---|---|
| 6,382,556 B1* | 5/2002 | Pham | B64C 27/28 244/6 |
| 10,081,436 B1* | 9/2018 | Tian | B64D 31/00 |
| 2004/0169485 A1* | 9/2004 | Clancy | B63H 25/42 318/588 |
| 2010/0230547 A1* | 9/2010 | Tayman | B64C 27/24 244/7 C |
| 2011/0260462 A1* | 10/2011 | Vander Lind | A63H 27/002 290/55 |
| 2011/0272519 A1* | 11/2011 | Challis | B64C 27/26 244/6 |
| 2014/0061368 A1* | 3/2014 | Karim | B64C 29/0033 244/12.4 |
| 2014/0158815 A1* | 6/2014 | Renteria | B64C 29/0025 244/12.1 |
| 2015/0028151 A1* | 1/2015 | Bevirt | B64C 29/0025 244/6 |
| 2015/0266571 A1* | 9/2015 | Bevirt | B64D 27/24 244/7 C |
| 2017/0300066 A1* | 10/2017 | Douglas | B64C 29/0008 |
| 2018/0186448 A1* | 7/2018 | Pantalone | B64C 27/08 |
| 2018/0297711 A1* | 10/2018 | Oldroyd | B64D 31/06 |

* cited by examiner

Primary Examiner — Assres H Woldemaryam
(74) Attorney, Agent, or Firm — WPAT, P.C., Intellectual Property Attorneys; Anthony King

(57) ABSTRACT

An aircraft design where the one or multiple numbers of vertical stabilizer each has a lifting propeller.

17 Claims, 15 Drawing Sheets

AIRCRAFT VERTICAL STABILIZER HAVING A LIFT PROPELLER AND THE METHOD OF USING THE SAME

FIELD OF THE DISCLOSURE

The present disclosure relates to a configuration of an aircraft, and more particularly, an aircraft having at least one vertical stabilizer wherein the vertical stabilizer has a lift propeller.

BACKGROUND OF THE DISCLOSURE

Generally, a drone is an unmanned aerial vehicle (UAV) either remotely controlled by a user or is autonomously flown. Drones are known to perform various functions both in military and civilian applications. In particular, a drone can carry a payload, capture images or videos, collected data, and survey the environment. There are drones that are considered fixed-wing drones which generally have longer flight time and faster flight speed. There are also drones that are considered vertical takeoff and landing (VTOL) multicopter drones which generally have slower flight speed when compared to fixed-wing drones.

A VTOL multicopter drone of the related art consists of a body and a number propellers each driven by a motor. The number of propellers are typically even numbers such as four, six, or eight. These motors are supported on radially-extending support arms. VTOL multicopter drones have multiple propellers each having a plane of rotation that is generally parallel to the ground, thereby allowing the VTOL drone to vertically takeoff and land.

A fixed-wing drone of the related art typically has a fuselage, a pair of wings, a pair of horizontal stabilizers. Traditional fixed-wing drones takeoff and land using a runway. Fixed-wing drones, however, are also known to have some propellers each having a plane of rotation that is generally parallel to the ground, thereby allowing the fixed-wing drone to vertically takeoff and land similar to a VTOL multicopter drone.

Whether it is a VTOL multicopter drone or a fixed-wing drone with vertical takeoff and landing capabilities, the propellers in these drones are driven by a motor. Each motor is configured to drive one propeller. Each motor is encased in a motor housing.

Recently, VTOL multicopter drones designed for civilian application equipped with four, six, or eight propellers are popularly used. In these drones, the motor that drives each propeller is located directly underneath each propeller within a noticeable motor housing.

There is a continuing need for new ways to design the aerodynamics of VTOL multicopter drones and fixed-wing drones.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, an unmanned aerial vehicle (UAV) having at least one motor each having a motor shaft, at least one propeller each having a propeller shaft, where each propeller is driven by a motor. The propeller shaft can be disposed at an angle between 90 degrees to 135 degrees relative to the motor shaft.

In an aspect combinable with the general implementation, there can be a motor shaft gear coupled to the motor shaft, a propeller gear coupled to the propeller shaft, wherein the motor shaft gear can make engaging contact with the propeller shaft.

In another aspect combinable with the general implementation, there can be a connecting link having a first end and a second end; the first end is connected to motor shaft; the second end is connected to the propeller shaft. The connecting link transfers torque from the first motor to the first propeller.

In another aspect combinable with the general implementation, the connecting link is a system of gears.

In yet another aspect combinable with the general implementation, the drone is a fixed wing drone having a wing wherein the motor is disposed within the wing, and the propeller is disposed on a top side of the wing.

In another aspect combinable with the general implementation, the motor is an inner rotor motor.

In still another aspect combinable with the general implementation, the drone is a multicopter drone having a body and at least one support arm connecting the body to the at least one propeller, and wherein the motors are each disposed within the support arm.

In yet another general implementation, powertrain of an aerial vehicle wherein the aerial vehicle has at least one lifting propeller driven by the powertrain, the powertrain includes a motor having a motor shaft, and wherein the motor is disposed within either a wing or a support arm of the aerial vehicle. There can be a connector to physically connect the motor shaft to the propeller, thereby transferring a torque from the motor shaft to the propeller.

In another aspect combinable with the general implementation, the motor shaft can be substantially perpendicular to a longitudinal axis of either the wing or the support arm to which the motor is disposed in.

In another aspect combinable with the general implementation, the aerial vehicle can be a vertical takeoff and landing (VTOL) drone, and the motor can be an inner rotor motor.

In another aspect combinable with the general implementation, the aerial vehicle can be a fixed-wing drone, and the motor can be an inner rotor motor.

In yet another general implementation, there is provided a method of reducing air drag in an aerial vehicle, the method can include placing a motor within either a wing or a support arm of the aerial vehicle, wherein the motor shaft of the motor can be substantially parallel to a longitudinal axis of the wing or support arm to which the motor is placed in.

In another aspect combinable with the general implementation, the propeller can have a rotating axis perpendicular to a horizontal axis of the aerial vehicle, and the rotating axis can be at an angle between 90 degrees to 135 degrees relative to the motor shaft.

In another aspect combinable with the general implementation, the rotating axis can be at an angle of about 90 degrees relative to the motor shaft.

In another aspect combinable with the general implementation, the motor can be placed within a first section of a wing, wherein a second section of the wing immediately adjacent to the first section can have a thickness substantially similar to a thickness of the first section.

Accordingly, the present disclosure is directed to a drone having a novel arrangement of its powertrain system, and a method of making a drone having an enhanced aerodynamic profile. The present disclosure also relates to a method of minimizing air drag on an aircraft, whether manned or unmanned, regardless of the size of the aircraft.

In one aspect of the many embodiments to be discussed in more details later, a motor that drives a lifting propeller can be strategically placed where the motor's motor shaft is not co-axial with the propeller shaft.

In another aspect of the many embodiments to be discussed in more details later, a motor that drives a lifting propeller can be strategically placed at an angle where the motor's motor shaft is at an angle between 90 degrees to 135 degrees to the propeller shaft.

In yet another aspect of the many embodiments to be discussed in more details later, a motor that drives a lifting propeller can be strategically placed at an angle where the motor's motor shaft is at an angle between 45 degrees to 135 degrees to the propeller shaft.

In still yet another aspect of the many embodiments to be discussed in more details later, a motor that drives a lifting propeller can be strategically placed at an angle where the motor's motor shaft is at an angle between 55 degrees to 135 degrees to the propeller shaft.

In one aspect of the many embodiments to be discussed in more details later, a motor that drives a lifting propeller can be strategically placed at an angle where the motor's motor shaft can be substantially parallel to the ground during flight.

In yet another aspect of the many embodiments to be discussed in more details later, a motor that drives a lifting propeller can be connected by a transmission such that the motor does not directly drive the lifting propeller.

In still another aspect of the many embodiments to be discussed in more details later, a motor that drives a lifting propeller can be connected by a set of gears such that the motor indirectly drives the lifting propeller.

In another aspect of the many embodiments to be discussed in more details later, a motor that drives a lifting propeller can be sized to fit within a support arm or a wing to which the propeller is coupled to, without the need for a separate motor housing.

In one object of the many embodiments to be discussed in more details later, a motor that drives a lifting propeller can be discreetly placed within a support arm or a wing to which the propeller is coupled to, without substantially changing the outside aerodynamic profile of the support arm or the wing.

Further, it is contemplated that an aerodynamic profile of a drone can be improved by eliminating the use of a motor housing to house a motor. In the alternative, the motor can be an inner rotor motor sized to fit within a support arm or a wing.

It is still further contemplated a novel method where a transmission mechanism can be used to transmit the torque produced by a motor to a propeller, wherein the motor is not placed directly underneath the propeller shaft.

Among the many possible implementations of the embodiments, a drone can have a support arm having more than one propeller on the same support arm. This one support arm can have more than one motors arranged within the same support arm in any of the disclosed methods. For example, there can be a motor at one terminal end of the support arm to indirectly drive a first propeller. There can be another motor at the opposite terminal end of the support arm to indirectly drive another propeller. Optionally, there can be third motor located in the mid-section (or anywhere between the two terminal ends of the support arm) of the support arm to indirectly drive third propeller.

Another aspect of the embodiment is directed to methods of driving more than one propellers coupled to a single support arm, where each motor that drives each propeller is discreetly placed within the single support arm such that the motor shaft of each motor is substantially parallel to the longitudinal axis of the single support arm. In this embodiment, the single support arm can have substantially the same exterior profile throughout the length of the support arm.

Also contemplated is a design of an aircraft where the aircraft can have a left fixed wing, a right fixed wing, a fuselage coupled to the left and the right fixed wings, at least one tail coupled to the fuselage, and wherein each of the at least one tail has a vertical stabilizer. The vertical stabilizer can have a top distal end. A propeller can be disposed on the top distal end of the vertical stabilizer.

In one embodiment, the aircraft can have a motor disposed within the vertical stabilizer.

In another embodiment, the motor can be disposed within the top distal end of the vertical stabilizer.

In yet another embodiment, the motor has a rotary axis and the rotary axis is substantially parallel to a longitudinal axis of the aircraft.

Still yet another embodiment includes where motor can be located below the vertical stabilizer, within a structure to which the vertical stabilizer is fixed to. There can further be a propeller shaft disposed within the vertical stabilizer from the top distal end to a bottom proximal end of the vertical stabilizer, connecting the motor to the propeller.

Additionally, the aircraft design can be single tail, double tail, or having at least two tails.

Whether it is single, tail, double tail, or more than two tails, each of the tail can have a vertical stabilizer, and each vertical stabilizer can have a lifting propeller disposed on its top distal end.

A further embodiment includes where the aircraft can be an unmanned aerial vehicle (UAV) or a passenger plane.

In one particular embodiment, the aircraft can have a left linear support connected to the left fixed wing and connected to the left tail, and a right linear support connected to the right fixed wing and connected to the right tail. Each of the left and right linear supports can each have at least two additional lifting propellers disposed thereon.

While this specification contains many specific implementation details, these should not be construed as limitations on the scope of any embodiments or of what may be claimed, but rather as descriptions of features specific to particular implementations of particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

As used herein, the term "drone" refers to an aerial vehicle, whether unmanned (i.e., a UAV) or designed to carry human passengers. For example, it can be a fixed-wing aircraft sufficiently light to be carried in a child's hand, a fixed-wing aircraft sufficiently large to sit more than a few human passengers, or any such aircraft having a weight and size that falls in between the two extreme examples. In yet another example, it can be a multicopter aircraft sufficiently small to fit in a user's palm, a multicopter large enough to carry more than just a few human passengers, or any multicopter sized in between the two extreme examples.

The inventors have discovered that a drone's aerodynamic profile is typically negatively affected by the size and shape of the motor that drives its lifting propellers. Lifting propellers of a drone are typically found in multicopter drones. Some fixed-wing drones can also have lifting propellers to give the fixed-wing drone the capability to vertically takeoff and land.

Figure 1:
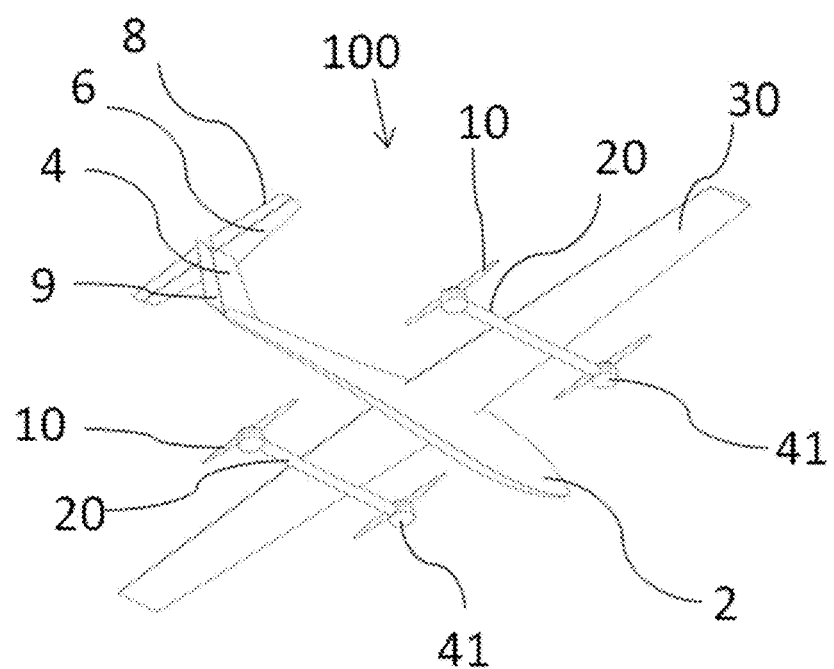
FIG. 1 is a perspective view of a prior art fixed-wing drone, showing each wing having a support arm and at the terminal ends of each support arm, a bulky motor housing.

Referring first to FIG. 1, FIG. 1 generally depicts a basic model of a fixed-wing drone 100. In this prior art fixed-wing drone 100, the fixed-wing drone 100 has a fuselage 2, and two main wings 30 extending from the frontal part of the fuselage 2. On each of the two main wings 30 is provided a support arm 20. The support arm 20 has a generally elongated cylindrical configuration with one end extending beyond the leading edge of the main wing 30 and the opposite terminal end extending behind the trailing edge of the main wing 30. The main purpose of the support arm 20 in the prior art drone 100 is to hold and support a motor housing at the terminal ends of the support arm 20. The support arm 20 is typically elongated so as to hold the motor housings 41 further away from the main wings 30. The motor housing 41 in these prior art fixed-wing drones typically has a much bulkier short cylindrical outer contour having a center axis generally perpendicular to the center axis of the support arm 20. In a way, the prior art motor housing 41 and support arm 20 configuration is similar to a hammerhead to a hammer handle. Some manufacturers of drones have attempted to camouflage this awkward configuration by covering up this configuration with an aerodynamic outer casing (not shown) thereby making the entire drone bulkier, albeit with a more aerodynamic flair. Underneath the bulky aerodynamic outer casing of such prior art design, remains a bulky motor directly driving a propeller positioned directly above it.

Prior art fixed-wing drone has a vertical stabilizer 4 at its tail end, and two horizontal stabilizers 6 attached to the vertical stabilizer 4. On each horizontal stabilizer there is an elevator 8 to adjust a pitch of the drone 100. On the trailing edge of the vertical stabilizer 4 is a rudder to control the yaw of the drone 100.

Figure 2:
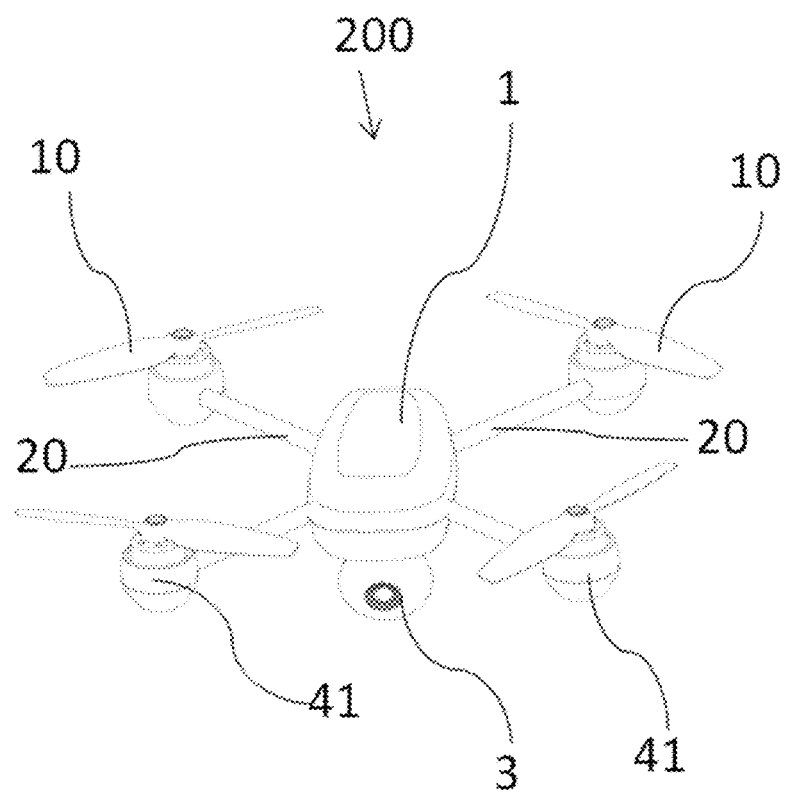
FIG. 2 is a perspective view of a prior art VTOL multicopter drone, showing four support arms and at the terminal end of each support arm, a bulky motor housing.

In FIG. 2, a prior art VTOL multicopter drone 200 is known to have a body 1 from which there are radially extending support arms 20. In this particular example, there are four support arms 29 radially extending from the body 1. At the distal end of each support arm 20 is a motor housing 41 which encloses a motor that directly drives the lifting propeller 10 directly above it. A camera 3 is provided underneath the body 1 to take aerial shots of intended targets below. As discussed above, the support arm 20/motor housing 41 combination resembles a hammer and creates drag due to its aerodynamic profile. There have been attempts to improve the aerodynamic profile by covering up the support arm 20 motor housing 41 combination with a bulkier but more aerodynamic outer casing (not shown). Nevertheless, the arrangement and design of inner components in these prior art VTOL multicopter drones remain the same.

Figure 3:
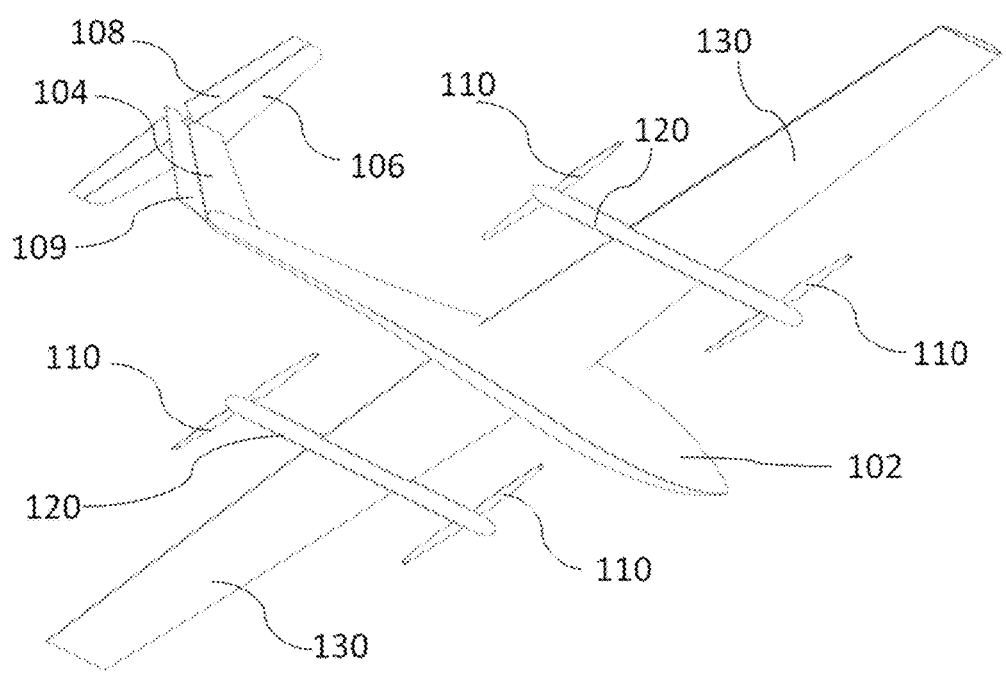
FIG. 3 is a bottom perspective view of one embodiment of a fixed-wing drone, showing each wing having a support arm and the terminal ends of each support arm has a low profile contour.

Referring now to the detail of FIG. 3, a fixed-wing drone is shown having a fuselage 102 and two main wings 130 extending from the two sides of the fuselage 102. On each of the two main wings 130 there can be disposed a support arm 120 extending across a mid-section of the main wing 130 with a front end extending beyond the leading edge of the main wing 130, and a hind end extending behind the trailing edge of the main wing 130. There can be two propellers 110 coupled to each support arm 120. In this particular embodiment, the propellers 110 are disposed on the terminal ends of the support arm 120. Unlike prior art designs, there are no motor housings disposed under each propeller 110.

In other words, each of the support arms 120 as shown in FIG. 3 is free from attachment, on its terminal ends, to an object substantially larger or wider than the support arms 120 themselves. Indeed, the support arms 120 shown in this particular embodiment can minimize air drag and improve the aerodynamic profile of the drone.

The fixed-wing drone as shown in FIG. 3 also features a vertical stabilizer 104 on the tail end of the drone. There can be a rudder 109 attached to the vertical stabilizer 104 in order to change a yaw of the drone. Near the top end of the vertical stabilizer 104 are two horizontal stabilizers 106. Attached to the trailing edge of each of the two horizontal stabilizers 106 is an elevator 108 to change a pitch of the drone.

As those of ordinary skill in the art will recognize, the drone style as shown in FIG. 3 is only one example of the disclosed embodiments. Location of the lifting propellers 110 may readily be modified as dictated by the aesthetic or functional needs of particular applications. For example, as will be described below, the drone may be a canard style aircraft, or a multicopter drone.

In other examples which will be discussed later, the lifting propellers 110 may even be disposed in the mid-section of the support arm 120, or the lifting propellers 110 may even be disposed anywhere on the main wing 130.

Although this particular embodiment discloses using a 2-blade propeller 110, it should be understood that other numbers of blades can be used for each propeller 110.

The contemplated fixed-wing drone can be made of suitable light-weight materials to withstand extreme weather conditions, such materials include natural and synthetic polymers, various metals and metal alloys, naturally occurring materials, textile fibers, and all reasonable combinations thereof.

Figure 4:
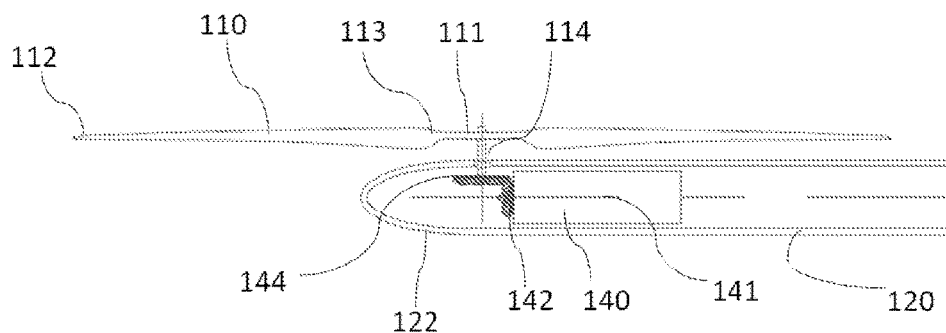
FIG. 4 is a side transparent view of one embodiment of a support arm where a motor is disposed at its terminal end, using gears to drive a propeller shaft which in turn drives the propeller.

FIG. 4 illustrates one way how the inner components are arranged to drive a lifting propeller as described in FIG. 3. In FIG. 4, the terminal end of a support arm 120 can enclose a motor 140 to drive the propeller 110. The motor 140 can have a motor shaft 141 generally disposed near the middle axis region of the motor 140. The motor shaft 141 rotates thereby turning a driving gear 142 which can be directly attached to the motor shaft 141. The driving 142 may make meshing contact with a propeller gear 144. The plane of rotation for the driving gear 141 and the plane of rotation for the propeller gear 144 are at a right angle. As will be described in other embodiments later, the plane of rotation for the driving gear 141 and the plane of rotation for the propeller gear 144 can be at an angle other than a right angle, depending on the specific design and application of the drone.

As shown further in FIG. 4, the motor shaft 141 can be substantially parallel to the longitudinal axis of the support arm 120. In some embodiments such as the one shown in FIG. 4, the motor shaft 141 can be substantially co-axial to the longitudinal axis of the support arm 120.

Operation of this embodiment is straightforward. Motor 140 can be powered by a power source (not shown) and its motor shaft 141 rotates thereby rotating the driving gear 142. The driving gear 142, while meshed with the propeller gear 144, also turns the propeller gear 144. The propeller gear 144 can be attached to a propeller shaft 114 which can be attached to the blade of the propeller 110. Each propeller blade has a tip 112 and a root 113. The root 113 of the propeller 110 can be attached to the propeller shaft 114 via a hub 111.

In the embodiment shown in FIG. 4, a portion of propeller shaft 114, the entire propeller gear 144, the entire driving gear 142, and the entire motor 140 are enclosed within or near the support arm tip 122.

As will be illustrated in connection with FIG. 5, a portion of propeller shaft 114, the entire propeller gear 144, the entire driving gear 142, and the entire motor 140 can be enclosed within a mid-section or any section of the support arm 120.

Figure 5:
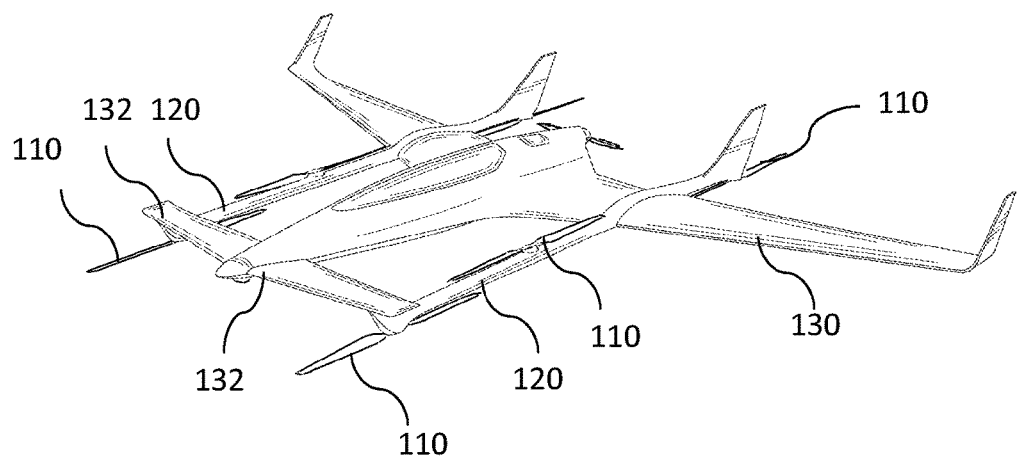
FIG. 5 is a top perspective view of one embodiment of a fixed-wing drone having two support arms where each support arm has three propellers each driven by discreetly placed motors.

Referring now to FIG. 5 is a canard style drone having two support arms 120. Each support arm 120 can span across a main wing 130 and a canard wing 132. By spanning across the main wing 130 and the canard wing 132, structural integrity is strengthened. Each support arm 120 can have more than two lifting propellers 110. Here, besides having two lifting propellers 110 each located at the opposite ends of the support arm 120, a third lifting propeller 110 is provided near the mid-section of the support arm 120.

The front lifting propeller 110 can face downward, the mid-section lifting propeller 110 can face upward, and the rear lifting propeller 110 can face downward. This arrangement can allow two adjacent lifting propellers 110 to be dispose closer together such that their circular range of movement may overlap from a top view, but their blades do not physically touch each other. Whether the lifting propellers 110 face upward or downward, they can be designed to thrust air downwards based on the angle of the propeller blade and/or the direction of propeller rotation.

Figure 6:
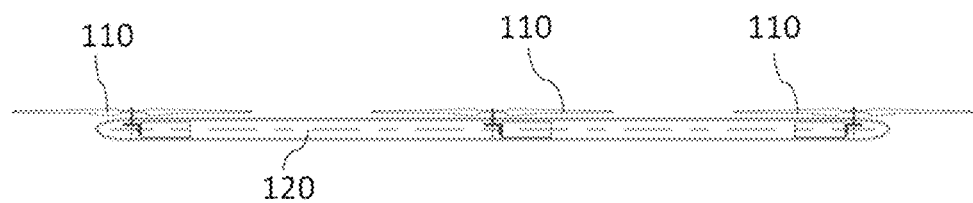
FIG. 6 is a side transparent view of one exemplar support arm having three propellers each driven by a discreetly placed motor.
Figure 7:
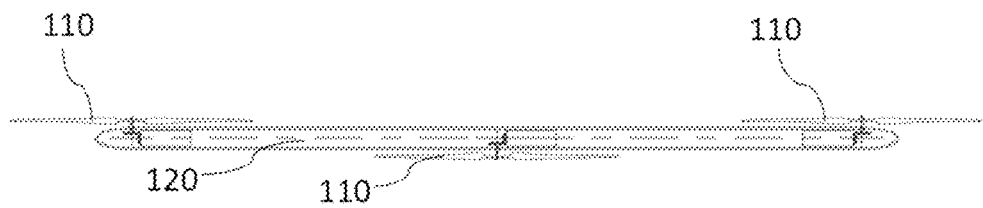
FIG. 7 is a side transparent view of another exemplar support arm having three propellers each driven by a discreetly placed motor. The middle propeller is disposed on the bottom side of the support arm.
Figure 8:
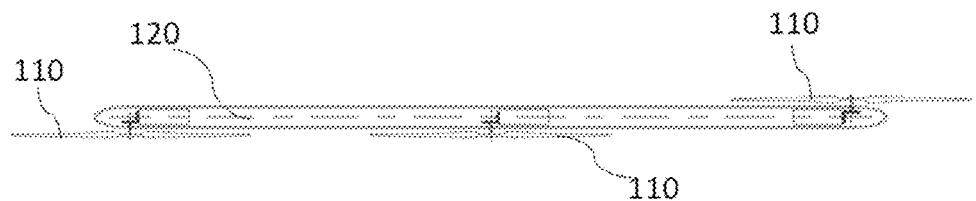
FIG. 8 is a side transparent view of yet another exemplar support arm having three propellers each driven by a discreetly placed motor. One of the three propellers is disposed on a side opposite to the other two propellers.

Other possible arrangements are possible. FIG. 6 shows one embodiment where a support arm 120 can have all three lifting propellers 110 facing upward. FIG. 7 shows one embodiment where a support arm 120 can have two terminal lifting propellers 110 facing upward, while a mid-section lifting propeller 110 facing downward. FIG. 8 shows another embodiment where a support arm 120 can have one terminal lifting propellers 110 facing upward, while the other two lifting propellers 110 facing downward.

It is important to appreciate that in the embodiments of FIG. 3 and FIG. 5, a good aerodynamic profile is particularly desired because a fixed-wing drone 200 is typically capable of flying at a relatively faster speed than a multicopter drone 100. For any fast-flying aircraft, aerodynamic profile and air drag are important issues that can affect power/fuel consumption, speed, and endurance of the aircraft. As illustrated by the canard drone of FIG. 5, none of the lifting propellers 110 are accompanies by bulky motor enclosed in a bulky motor housing. Simply miniaturizing prior art design by having a very small motor to directly drive a propeller would not be feasible especially for a small size drone because the support arm 120 in such small size drone would be too small to enclose a motor large enough to directly drive the propeller 110. Direct drive is defined as driving a propeller using a motor where the motor shaft of the motor and the propeller shaft are co-axial.

In the contemplated embodiments, the motor 140 can be any type of motor capable of producing sufficient amount of torque. Specifically contemplated are inner rotor motors.

Figure 9:
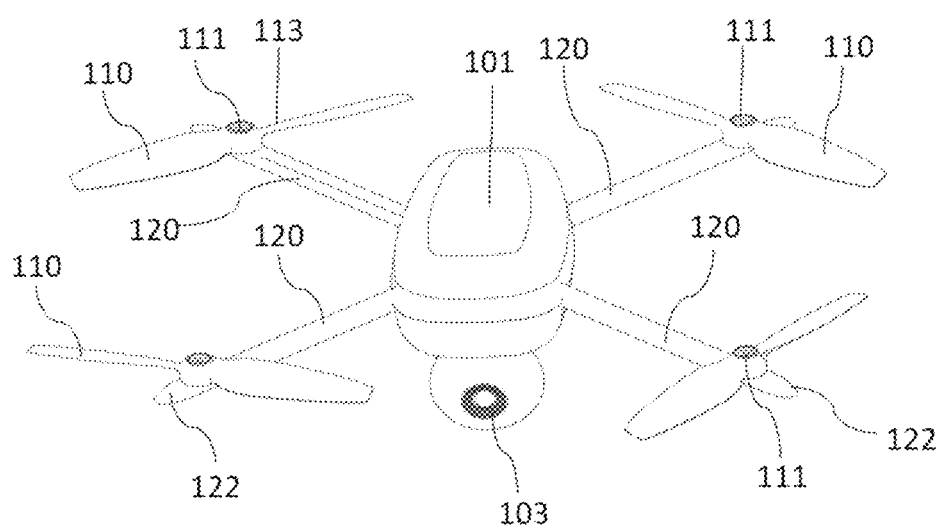
FIG. 9 is a top perspective view of an embodiment of a VTOL multicopter drone where the motors that drive each propeller are discreetly arranged within each support arm.

FIG. 9 generally depicts the basic design of a contemplated embodiment where a VTOL multicopter drone can implement the powertrain designs of the disclosure. In FIG. 9, a VTOL multicopter drone can have four support arms 120, each support arm 120 supporting a lifting propeller 110. While only four support arms 120 and four lifting propellers 110 are shown, one or ordinary skill in the art would immediately recognize that other numbers of support arms 120 and lifting propellers 110 can also implement the powertrain designs of the disclosure. For example, a VTOL multicopter drone having six support arms each support arm having two lifting propellers (one on top, one at the bottom, both co-axial at the distal end of the support arm) can also implement the powertrain system of the current disclosure.

The VTOL multicopter drone in FIG. 9 can have an optional camera 103 attached below the body 101. Each lifting propeller 110 has a root 113 and is attached to the propeller shaft via a hub 111 as previously described. These lifting propellers 110 can be disposed at or near the support arm tip 122 of each support arm 120.

Figure 10:
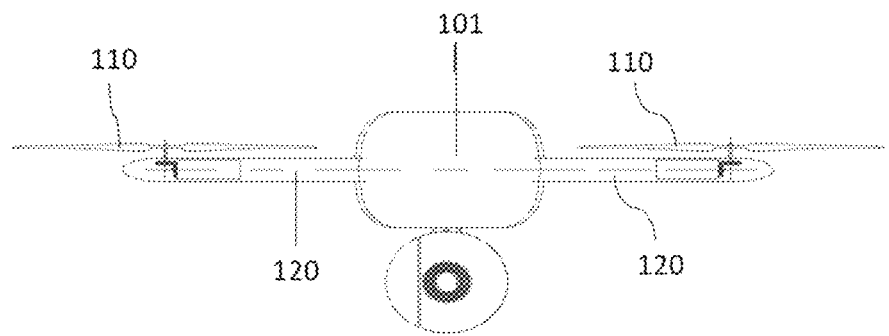
FIG. 10 is a side transparent view of the embodiment of FIG. 9.

As shown further in FIG. 10, each support arm 120 is substantially horizontally level with the body 101 of the drone.

Figure 11:
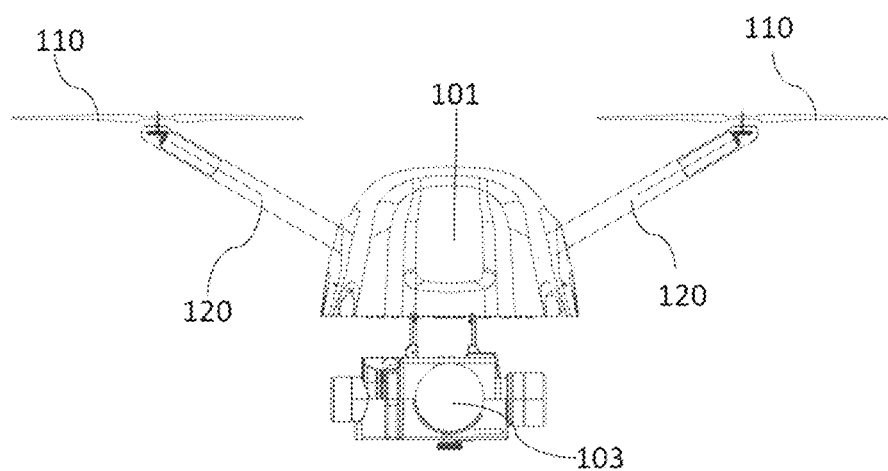
FIG. 11 is a graphical representation of a contemplated VTOL multicopter drone where the motors that drive each propeller are discreetly arranged within each support arm, and each support arm is at a tilted angle while the propellers are parallel to the ground.
Figure 12:
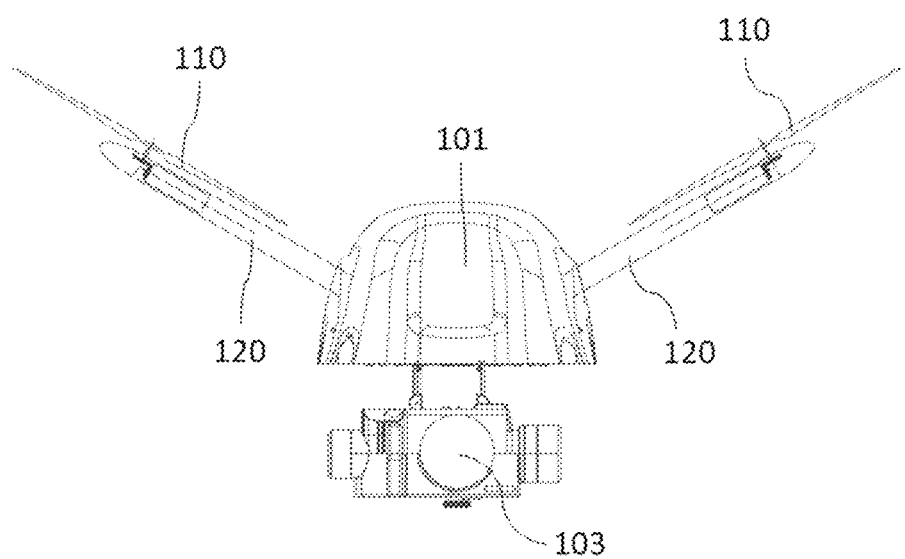
FIG. 12 is a graphical representation of another contemplated VTOL multicopter drone where the motors that drive each propeller are discreetly arranged within each support arm, and each support arm is at a tilted angle while the propellers are not parallel to the ground.

There may be designs where each support arm 120 is at an angle to the body 101 of the drone. In FIGS. 11 and 12, the support arms 120 are at a fixed angle tilted upward. The design in FIG. 11 is different from the design in FIG. 12 in that the planes of rotation for their lifting propellers are different. In FIG. 11, the plane of rotation of its lifting propeller is at about 45 degrees angle to the longitudinal axis of the support arm 120 to which the lifting propeller 110 is coupled to. In FIG. 12, the plane of rotation of its lifting propeller remains substantially parallel to the longitudinal axis of the support arm 120 to which the lifting propeller 110 is coupled to.

Figure 13:
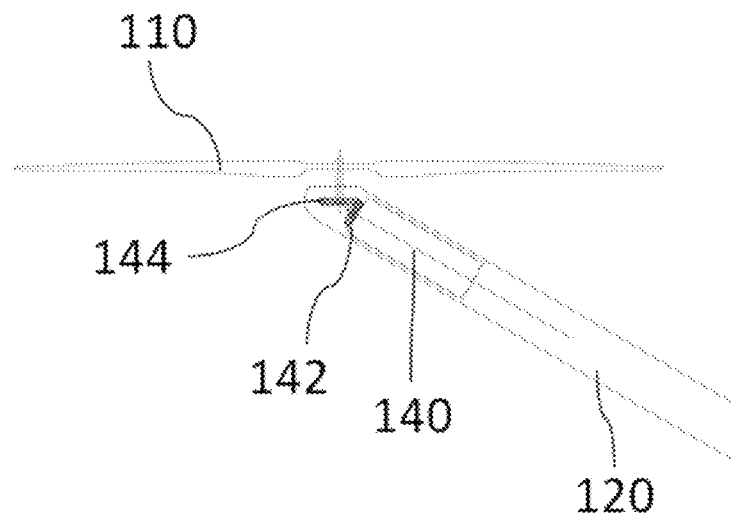
FIG. 13 is a transparent side view of the terminal end of a support arm from FIG. 11, showing the gears meshing at a tilted angle while the propeller is parallel to the ground.
Figure 14:
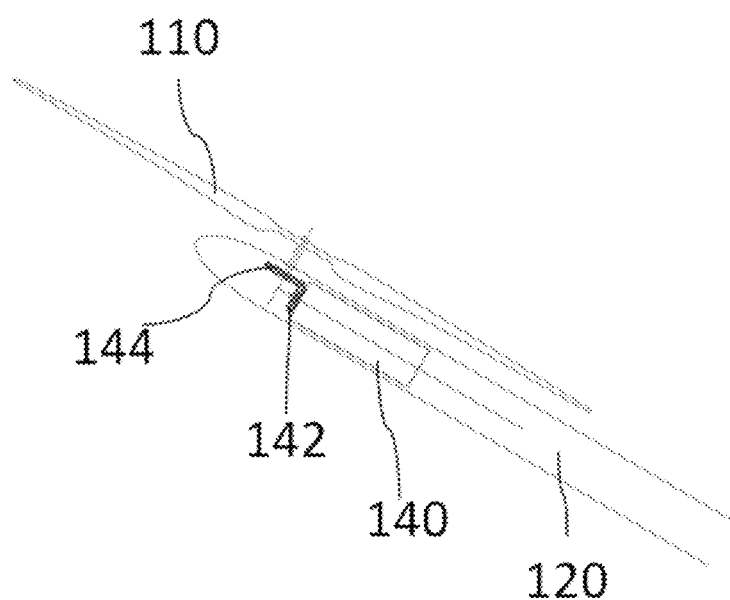
FIG. 14 is a transparent side view of the terminal end of a support arm from FIG. 12, showing the gears meshing at a right angle while the propeller has a plane of rotation parallel to the longitudinal axis of the support arm.

FIGS. 13 and 14 illustrate the meshing of driving gear 142 to the propeller gear 144 in the designs of FIGS. 11 and 12, respectively.

As shown in FIG. 13, an exemplary powertrain system is shown where the plane of rotation of a lifting propeller can be at about 45 degrees angle to the longitudinal axis of the support arm 120 to which the lifting propeller 110 is coupled to. In other words, the driving gear 142 can be meshed to the propeller gear 144 at about 45 degrees. The motor shaft 141 of the motor 140 is substantially parallel to the longitudinal axis of the support arm 120.

With respect to FIG. 13, an exemplary powertrain system is shown where the plane of rotation of a lifting propeller can be at about 90 degrees angle to the longitudinal axis of the support arm 120 to which the lifting propeller 110 is coupled to. In other words, the driving gear 142 can be meshed to the propeller gear 144 at about 90 degrees. The motor shaft 141 of the motor 140 is substantially parallel to the longitudinal axis of the support arm 120. The support arm 120, however, is tilted at an angle relative to a level horizontal axis of the VTOL multicopter drone.

In other embodiments, the driving gear 142 can be meshed to the propeller gear 144 at between 40-90 degrees.

FIG. 14 is just one example further illustrating the power train system of FIG. 12 in more detail. Here, the arrangement is similar to that previously described and shown in FIG. 4, except the arrangement in FIG. 14 has the support arm 120 in a fixed tilted angle.

Although the above embodiments disclose using driving gear and propeller gear meshed together to transfer a torque at an angle without being coaxial or being directly driven, it should be understood that other types of connectors or transmission gears or links can also be used to perform that same function as the disclosed gears.

The contemplated gears can be made of suitable materials to withstand temperature extreme and durability over time, such materials include natural and synthetic polymers, various metals and metal alloys, naturally occurring materials, textile fibers, glass and ceramic materials, and all reasonable combinations thereof.

Figure 15:
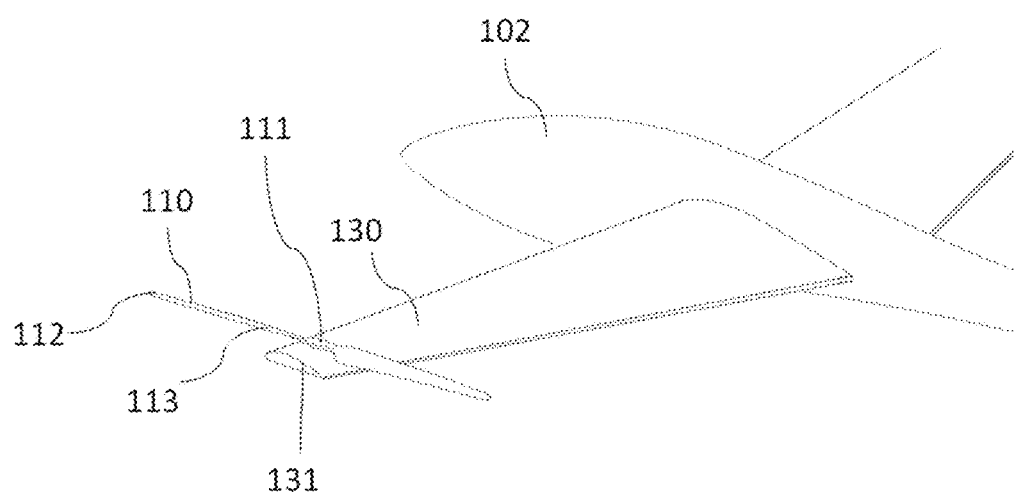
FIG. 15 is a top perspective view of one embodiment of a fixed-wing drone where a propeller is disposed on the wing and the motor driving the propeller is discreetly positioned within the wing without substantially changing the outside contour of FIG. 16 is front view of one embodiment of a fixed-wing drone where a propeller is disposed on the terminal end of each of the two wings. The motor that drives each propeller is illustrated in this transparent view as being disposed in the wing without substantially changing the aerodynamic profile of the wing because the motor is discreetly placed.

FIG. 15 generally depicts the basic architecture of a fixed wing drone in accordance with the one of the disclosed embodiments. Here, a main wing 130 is coupled to a fuselage 102 and can have a propeller 110 attached to the tip 131 of the main wing 130. The propeller 110 has a blade tip 112 and a root of blade 113. The propeller 110 is coupled to the main wing 130 via a hub 111. The propeller 110 can be driven using similar arrangement of discreetly placed motor and gears.

The propeller 110 allows the fixed wing drone to vertically takeoff and land and is contemplated to be placed on various locations of the main wing 130.

Figure 16:
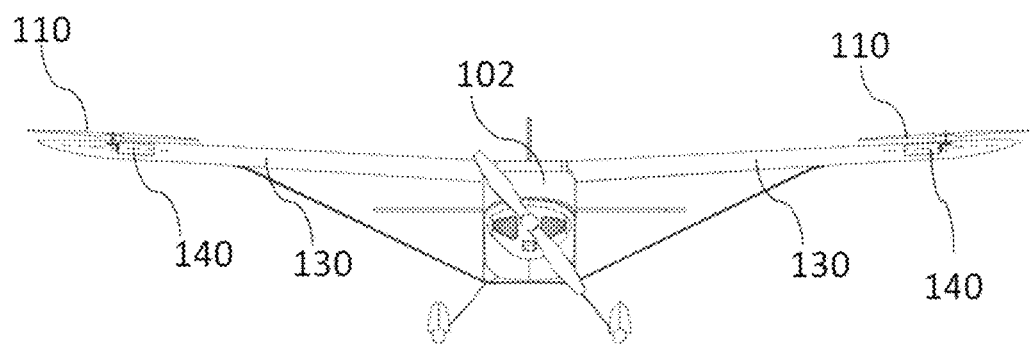

In one particular embodiment as shown in FIG. 16, a fixed wing drone may have two fixed wings 130 and each of the two fixed wings 130 can have a propeller 110 attached to its distal ends.

Figure 17:
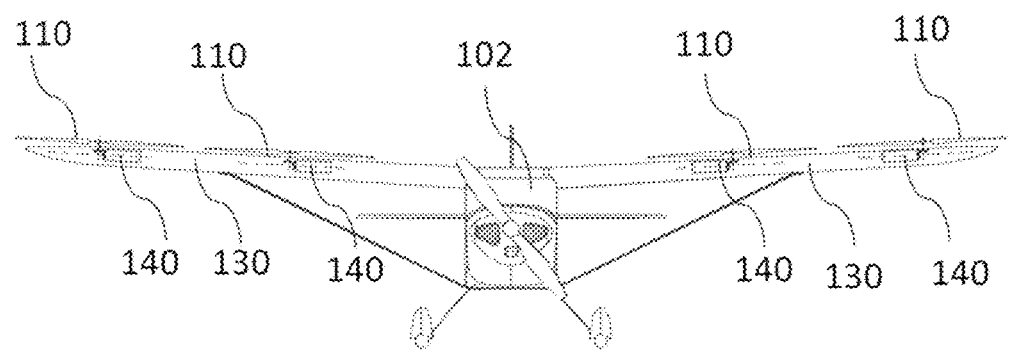
FIG. 17 is front view of one embodiment of a fixed-wing drone where two propellers are disposed on each of the two wings. The motor that drives each propeller is illustrated in this transparent view as being disposed in the wing without substantially changing the aerodynamic profile of the wing because the motor is discreetly placed.

In another particular embodiment as shown in FIG. 17, a fixed wing drone may have two fixed wings 130 and each of the two fixed wings 130 can have two propellers 110 attached to it. One being at the distal end of the wing 130, another being at the mid-portion of the wing 130.

Figure 18:
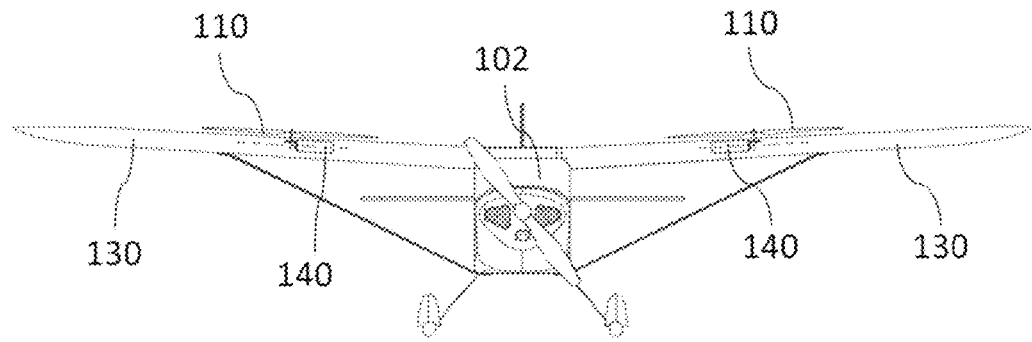
FIG. 18 is front view of one embodiment of a fixed-wing drone where a propeller is disposed on the mid-section of each of the two wings. The motor that drives each propeller is illustrated in this transparent view as being disposed in the wing without substantially changing the aerodynamic profile of the wing because the motor is discreetly placed.

In yet another particular embodiment as shown in FIG. 18, a fixed wing drone may have two fixed wings 130 and each of the two fixed wings 130 can have one propeller 110 attached to it at the mid-portion of the wing 130.

These particular designs allow a fixed wing drone to have propellers 110 without the need to have support arms. Support arms can add extra weight to the drone and may negatively affect the aerodynamic profile of the drone.

Figure 19:
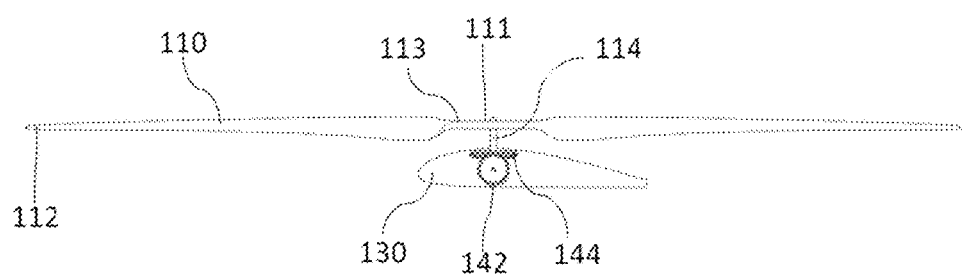
FIG. 19 is a cross-section view of a wing from FIG. 16, illustrating the meshing of the two gears to transmit torque from the motor to the propeller, according to one aspect of the disclosed embodiments.

As shown further in FIG. 19, a side transparent view of the wing 130 is shown to illustrate having a motor disposed within the wing 130 in a way where the motor shaft is substantially parallel to the longitudinal axis of the wing 130. The motor shaft is attached to a driving gear 142 that has a plane of rotation perpendicular to a plane of rotation of the propeller 110. The driving gear 142 meshes with a propeller gear 144. When the driving gear 142 turns the propeller gear 144 also turns. The ratio of the two gears can vary.

The propeller gear 144 is attached to a propeller shaft 114. When the propeller gear 144 turns, it also turns the propeller shaft 114 in the same direction. The propeller shaft 114 is attached to a propeller blade via a hub 111. The propeller blade consists of a root 113 and a tip 112.

It should be particularly noted that although only bevel gears are being shown in the drawing figures, all types of gears are contemplated for any of the herein disclosed embodiments. For example, the following types or combinations of gears may be used: spur gear, helical gear, parallel helical gear, internal gear, external gear, spiral bevel gear, miter gear, crossed helical gear, straight bevel gear, worm gear, and hypoid gears.

It also should be particularly noted that although gears are shown in the drawing figures as two meshing gears of similar sizes and diameters, any of the disclosed embodiments can use gears of different sizes and ratios to achieve different torque output or speed output.

One aspect of the instant disclosure is directed to a method of improving the aerodynamic profile of a drone, whether it is a multicopter drone or a fixed wing drone. In one aspect of the disclosure, the method includes placing a driving motor within a wing or a support arm to which the propeller is coupled to. The driving motor can be disposed within this wing or support arm wherein its motor shaft is substantially parallel to the longitudinal axis of the support arm or wing within which the motor is disposed.

Contemplated method can also include indirectly driving a lifting propeller using a connector so that a motor can still drive the lifting propeller even though the motor shaft of the motor has a longitudinal axis that is not co-axial to the propeller shaft.

Contemplated method can alternative include indirectly driving a lifting propeller using a connector so that a motor can still drive the lifting propeller even though the motor shaft of the motor has a longitudinal axis that is at an angle to the propeller shaft. This angle can be anywhere between 75 degrees to 135 degrees. In another embodiment, this angle can be anywhere between 90 degrees to 120 degrees. In still yet another embodiment, this angle can be anywhere between 90 degrees to 85 degrees.

Similarly, while operations and/or methods may be depicted in the drawings in a particular order, this should not be understood as requiring that such operations be performed in the particular order shown or in sequential order, or that all illustrated operations and/or method steps be performed, to achieve desirable results. In certain circumstances, multitasking and parallel processing may be advantageous.

Figure 20:
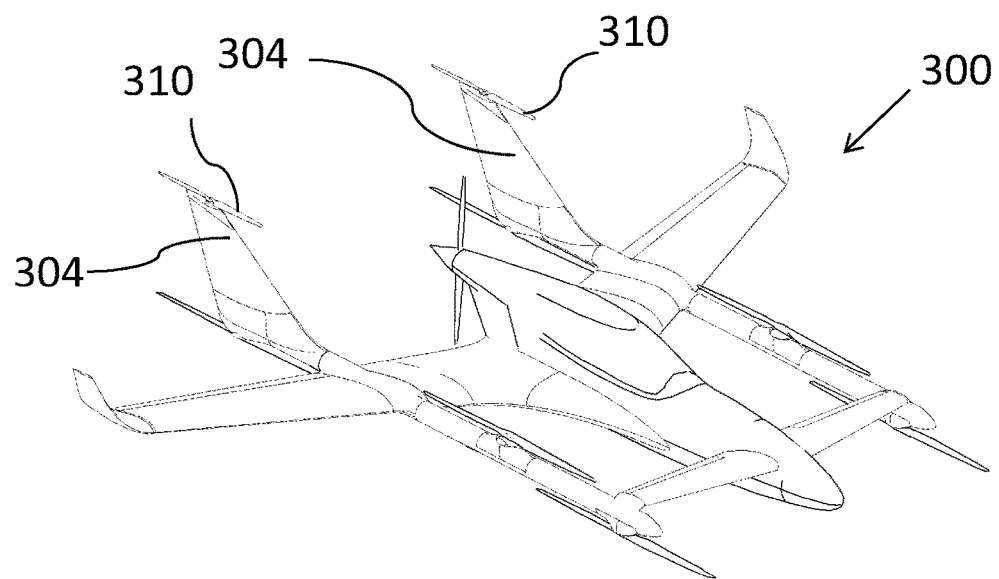
FIG. 20 is a perspective view of an airplane design where each of the two vertical stabilizers each has a lifting propeller disposed thereon.

Referring now to FIG. 20 is a design of an aircraft 300 where the aircraft 300 can have a left fixed wing, a right fixed wing, a fuselage coupled to the left and the right fixed wings, at least one tail coupled to the fuselage, and wherein each of the at least one tail has a vertical stabilizer 304. The vertical stabilizer 304 can have a top distal end 345. A propeller 310 can be disposed on the top distal end 345 of the vertical stabilizer 304.

The structure of this design in FIG. 20 is very similar to the one disclosed in FIG. 5. In FIG. 20, the aircraft 300 can have a left linear support connected to the left fixed wing and having a left tail disposed on its rear end. Similar, it also can have a right linear support connected to the right fixed wing and a right tail disposed on its rear end. Each of the left and right linear supports can each have at least two additional lifting propellers disposed thereon.

Although a double tail design is specifically discussed herein, the idea of having a lifting propeller 310 disposed on a vertical stabilizer 304 can be implemented on any airplane styles, being it single tail, double tails, or more than two tails.

Figure 21:
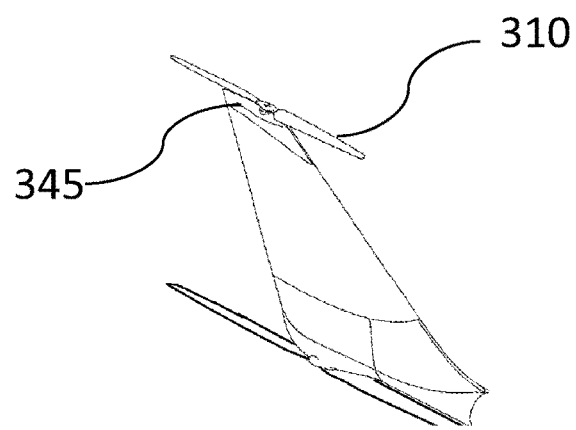
FIG. 21 shows another design of an airplane where a single tail can have a vertical stabilizer having a lifting propeller disposed thereon.

One way to implement having a lifting propeller 310 disposed on the top distal end 345 of the vertical stabilizer 304 is to have a motor 340 disposed within the vertical stabilizer. As illustrated in FIGS. 20 and 21, the top distal end 345 of a vertical stabilizer 304 can have a portion that slightly or significantly bulges out when compared to the rest of the relatively flat surface of the vertical stabilizer 304. The shape of the bulge is a generally rounded swelling and it can be generally elongated in a lengthwise direction that parallels with the longitudinal axis of the airplane 300. In this way, the aerodynamic effect of the airplane 300 is minimally affected.

Whether or not there is a bulge in the top distal end 345 of the vertical stabilizer 304 also depends on the relative size of the motor 340 when comparing to the size and thickness of the vertical stabilizer 304. In a first example, the airplane 300 may be a hybrid fixed-wing unmanned aerial vehicle (UAV) having a wingspan no greater than two meters. In this example, the motor 340 may be bigger than the thickness of its vertical stabilizer 304. As a result, a bulge would be created to fit the motor 340.

In a second example, the airplane 300 may be a passenger hybrid or fixed wing airplane. In this example, the thickness of the vertical stabilizer 304 would be much thicker than the thickness of the vertical stabilizer 304 in the first example. Being much thicker, there may be a motor 340 sized to fit within the thickness of the vertical stabilizer 304 without the need to create a bulge.

Figure 22:
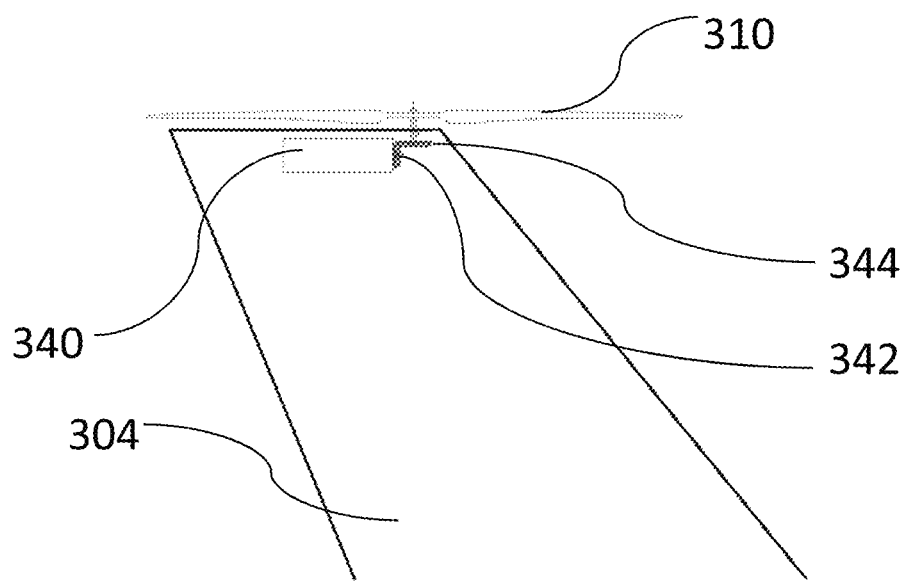
FIG. 22 illustrates the location of the motor being inside of the vertical stabilizer.

Referring now to FIG. 22 is the embodiment where the motor 340 can be disposed within the top distal end 345 of the vertical stabilizer 304. Similar to other embodiments discussed in this specification, there can be a driving gear 342 that make engaging contact with the propeller gear 344, which drives the propeller 310 via a propeller shaft.

As mentioned above, in a preferred embodiment, the motor 340 has a rotary axis and the rotary axis can be substantially parallel to a longitudinal axis of the aircraft. In this way, the necessary elongated bulge in the vertical stabilizer 304 would be disposed in a lengthwise direction thereby minimally affecting the aerodynamics of the vertical stabilizer.

Figure 23:
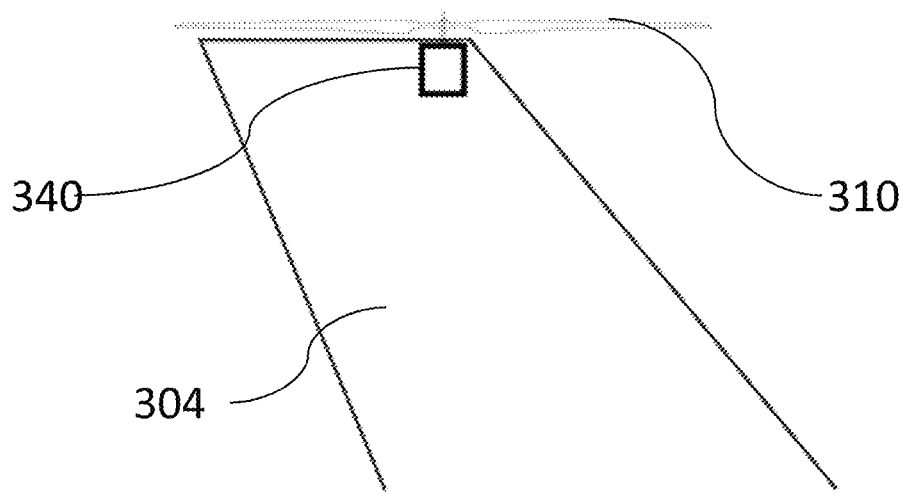
FIG. 23 illustrates the propeller being directly driven by a motor disposed inside of the vertical stabilizer.

In another aspect of the disclosed motor-propeller arrangement, the propeller 310 may be directly driven by the motor 340 as shown in FIG. 23. Here, the motor 340 is disposed directly below the propeller 310 and directly connects to the propeller 310 to drive it.

Figure 24:
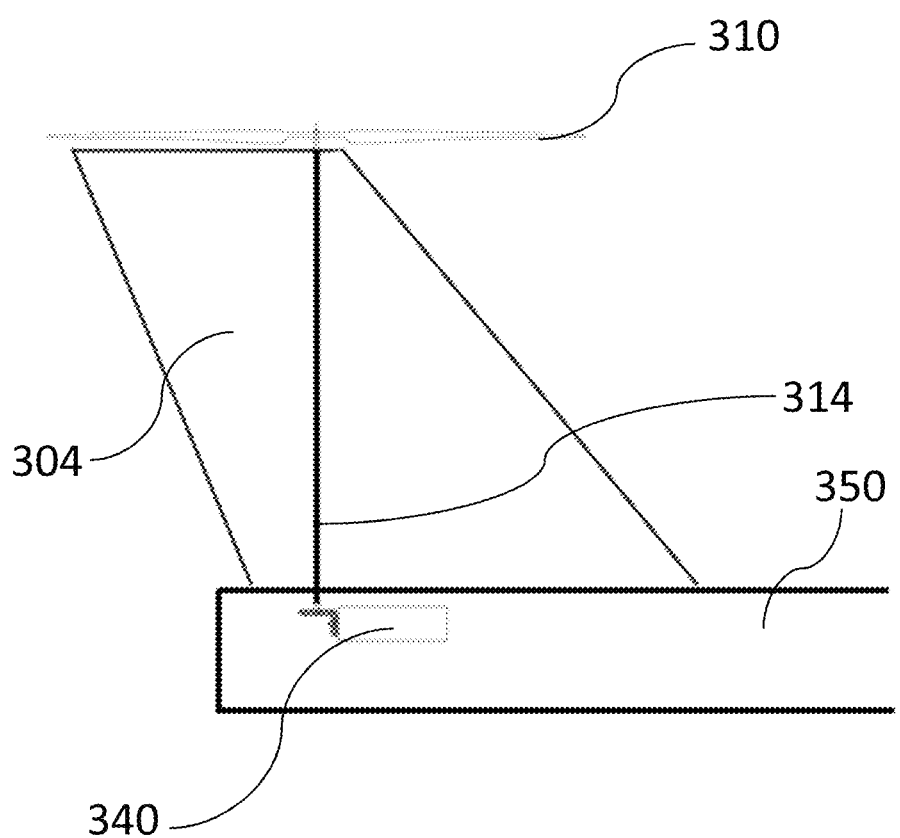
FIG. 24 illustrates the location of the motor being below the vertical stabilizer.

Still yet another embodiment includes a design where motor 340 can be located below the vertical stabilizer 304, such as one shown in FIG. 24. Here, the motor 340 can be disposed within a structure 350 to which the vertical stabilizer 304 is fixed to. This structure 350 may be the rear end of a fuselage, the rear end of a linear support (such as those shown in FIGS. 5 and 20), or other any other parts of the airplane to which the vertical stabilizer 304 is fixed to. To drive the propeller 310 disposed on the top distal end 345 of the vertical stabilizer 304, there can be a relatively longer propeller shaft 314 disposed within the vertical stabilizer from the top distal end 345 to a bottom proximal end of the vertical stabilizer 304, so the motor 340 may reach to the propeller 310. Although here in FIG. 24 the motor 340 indirectly drives the propeller 310 via the meshing of driving gear and propeller gear, a direct-drive arrangement can be implemented such that no gears are involved, similar to what is shown in FIG. 23, excepting using a long propeller shaft 314 as shown in FIG. 24.

This particular design of having a lifting propeller 310 disposed on the top distal end 345 of a vertical stabilizer 304 can be implemented whether the plane 300 is single, tail, double tails, or having more than two tails. Each of the tail can have a vertical stabilizer 304, and each vertical stabilizer 304 can have a lifting propeller 310 as described in any of the embodiments above.

There can be many uses for having a lifting propeller 310 on top of the vertical stabilizer 304. For one, they are used to supplement all other lifting propellers 110 to improve safety. For example, during vertical landing and takeoff in a hybrid VTOL fixed-wing aircraft such as that shown in FIG. 20, it is important that all or most of the lifting propellers disposed on the left and right linear supports function properly. When one or more such propellers malfunction, lifting propellers 310 on top of the vertical stabilizers 304 can supplement the array of other lifting propellers 110 to ensure a safe landing and takeoff. Another contemplated use of the lifting propeller 310 on the vertical stabilizer 304 is for it to function as an elevator. By controlling the speed of the lifting propeller 310 on the vertical stabilizer 304, one can effectively control a pitch motion of the airplane 300. In a double tail design as shown in FIG. 20, by separately and differentially control the speed of the left and right lifting propellers 310 on the respective left and right vertical stabilizers 304, one can effectively control a roll motion of the airplane 300.

In one embodiment, the lifting propeller 310 on the vertical stabilizer 304 can remain locked in a lengthwise position (as shown in FIG. 20) during flight, and can began functioning whenever needed during flight. For example, during high speed flight, all lifting propellers disposed along the length of the left and right linear supports may be locked, while only the two left and right lifting propellers 310 on the vertical stabilizers 304 functions to control the pitch and roll of the aircraft 300.

In another embodiment, the lifting propeller 310 on the vertical stabilizer 304 can be relatively smaller than the lifting propellers 310 disposed elsewhere on the plane 300.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a lightweight motor for a drone have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. An aircraft comprising:
   a left fixed wing;
   a right fixed wing;
   a fuselage coupled to the left and the right fixed wings;
   a left vertical stabilizer coupled to the fuselage, wherein the left vertical stabilizer has a left top distal end;
   a right vertical stabilizer coupled to the fuselage, wherein the right vertical stabilizer has a right top distal end;
   a left tail propeller disposed on the left top distal end of the left vertical stabilizer, said left tail propeller having a horizontal plane of rotation;
   a left motor to drive the left tail propeller; and
   wherein the left motor has a rotary axis and the rotary axis is substantially parallel to a longitudinal axis of the aircraft.

2. The aircraft as recited in claim 1, wherein the left motor is disposed within the left top distal end of the left vertical stabilizer.

3. The aircraft as recited in claim 1, wherein the aircraft is an unmanned aerial vehicle (UAV).

4. The aircraft as recited in claim 1, wherein the aircraft is a passenger plane.

5. The aircraft as recited in claim 1, wherein the left vertical stabilizer is fixed to a structure and the left motor is disposed within the structure directly below the left vertical stabilizer.

6. The aircraft as recited in claim 5 further comprising a propeller shaft disposed within the left vertical stabilizer from the left top distal end to a bottom proximal end of the left vertical stabilizer, connecting to the left motor.

7. The aircraft as recited in claim 6, wherein the aircraft is an unmanned aerial vehicle (UAV).

8. The aircraft as recited in claim 6, wherein the aircraft is a passenger plane.

9. An aircraft comprising:
   a left fixed wing;
   a right fixed wing;
   a fuselage coupled to the left and the right fixed wings;
   a left forewing and a right forewing, both of which coupled to the fuselage;
   a left tail having a left vertical stabilizer;
   a right tail having a right vertical stabilizer;
   a left tail propeller disposed on a top distal end of the left vertical stabilizer wherein the left tail propeller has a horizontal plane of rotation; and
   a right tail propeller disposed on a top distal end of the right vertical stabilizer wherein the right tail propeller has a horizontal plane of rotation;
   a left motor to drive the left tail propeller;
   wherein the left motor has a rotary axis and the rotary axis is substantially parallel to a longitudinal axis of the aircraft; and
   wherein the aircraft has a canard configuration.

10. The aircraft as recited in claim 9 further comprising a left linear support connected to the left fixed wing and connected to the left tail, and a right linear support connected to the right fixed wing and connected to the right tail.

11. The aircraft as recited in claim 10, wherein the left linear support has a first lifting propeller, a second lifting propeller, and a third lifting propeller disposed thereon.

12. The aircraft as recited in claim 11, wherein the left tail propeller disposed on a top distal end of the left vertical stabilizer is directly driven by a motor.

13. The aircraft as recited in claim 11, wherein the left lifting propeller disposed on a top distal end of the left vertical stabilizer is indirectly driven by a motor.

14. The aircraft as recited in claim 2 further comprising a left forewing and a right forewing both of which are coupled to the fuselage, both the left forewing and the right forewing being positioned forward of the left and right wings, respectively, and wherein each of the left and right forewings are shorter than each of the left and right wings, thereby creating a canard configuration.

15. The aircraft as recited in claim 14 further comprising a left linear support and a right linear support, each of the left and right linear support is parallel to the longitudinal axis of the aircraft, and the left linear support is connected to the left forewing and the left wing, and the right linear support is connect to the right forewing and the right wing.

16. The aircraft as recited in claim 15 further comprising at least three lifting propellers coupled to each of the left and right linear supports.

17. The aircraft as recited in claim 16, wherein two of the at least three lifting propellers of the left linear support are disposed on a bottom side of the left linear support, and one of the at least three lifting propellers is disposed on a top side of the left linear support.

* * * * *